United States Patent
Morin et al.

(10) Patent No.: US 11,216,867 B2
(45) Date of Patent: Jan. 4, 2022

(54) ARRANGING INFORMATION DESCRIBING ITEMS WITHIN A PAGE MAINTAINED IN AN ONLINE SYSTEM BASED ON AN INTERACTION WITH A LINK TO THE PAGE

(71) Applicant: Facebook, Inc., Menlo Park, CA (US)

(72) Inventors: Steve Morin, San Francisco, CA (US); Xuewei Ouyang, San Francisco, CA (US); Martin Mroz, San Francisco, CA (US); Anuj Madan, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 34 days.

(21) Appl. No.: 16/864,729

(22) Filed: May 1, 2020

(65) Prior Publication Data
US 2021/0342928 A1 Nov. 4, 2021

(51) Int. Cl.
G06Q 30/00 (2012.01)
G06Q 30/06 (2012.01)
G06N 7/00 (2006.01)
G06N 20/00 (2019.01)

(52) U.S. Cl.
CPC ......... G06Q 30/0643 (2013.01); G06N 7/005 (2013.01); G06N 20/00 (2019.01); G06Q 30/0623 (2013.01)

(58) Field of Classification Search
None
See application file for complete search history.

(56) References Cited

U.S. PATENT DOCUMENTS

| | | | |
|---|---|---|---|
| 9,189,811 B1 * | 11/2015 | Bhosle | G06Q 30/06 |
| 10,452,731 B2 * | 10/2019 | Royzner | G06F 16/9535 |
| 10,674,215 B2 * | 6/2020 | Sokolov | H04N 21/252 |
| 10,776,626 B1 * | 9/2020 | Lin | G06K 9/6253 |
| 10,891,676 B1 * | 1/2021 | Kan | G06Q 30/0643 |

(Continued)

OTHER PUBLICATIONS

Greg Linden et al. "Amazon.com Recommendations Item-to-Item Collaborative Filtering", IEEE Internet Computing, Jan./Feb. 2003, pp. 76-80. (Year: 2003).*

(Continued)

*Primary Examiner* — Naeem U Haq
(74) *Attorney, Agent, or Firm* — Fenwick & West LLP

(57) ABSTRACT

An online system receives information describing (an) item (s) associated with an entity and a content item including an image. The online system accesses and applies a trained machine-learning model to predict a probability that the content item includes an image of an item associated with the entity. If the probability is at least a threshold probability, a link to a page associated with the item that includes a set of the information describing the item(s) is added to the content item by the online system. Responsive to receiving an interaction with the link from a user presented with the content item, the online system determines a measure of similarity between the item and each additional item based on the information describing the item(s), arranges the set of the information describing the item(s) within the page based on the measure(s) of similarity, and sends the page for display to the user.

20 Claims, 5 Drawing Sheets

(56) References Cited

U.S. PATENT DOCUMENTS

| | | | | |
|---|---|---|---|---|
| 2003/0065578 | A1* | 4/2003 | Peyrelevade | A45D 44/005 705/14.54 |
| 2008/0215349 | A1* | 9/2008 | Baran | G06Q 30/0276 705/1.1 |
| 2009/0119234 | A1* | 5/2009 | Pinckney | G06N 20/00 706/12 |
| 2010/0250336 | A1* | 9/2010 | Selinger | G06Q 30/0643 705/26.7 |
| 2010/0312650 | A1* | 12/2010 | Pinckney | G06F 16/9535 705/14.66 |
| 2015/0058160 | A1* | 2/2015 | Cao | G06Q 30/0631 705/26.7 |
| 2015/0363943 | A1* | 12/2015 | Yalniz | G06T 7/90 345/591 |
| 2017/0061286 | A1* | 3/2017 | Kumar | G06Q 30/0269 |
| 2017/0091844 | A1* | 3/2017 | Yarvis | G06Q 30/0631 |
| 2018/0137191 | A1 | 5/2018 | Yan | |
| 2018/0218430 | A1* | 8/2018 | Prendki | G06Q 30/0631 |
| 2018/0247363 | A1* | 8/2018 | Agarwal | G06Q 30/0629 |
| 2020/0104898 | A1* | 4/2020 | Cui | G06Q 30/0631 |
| 2020/0327600 | A1* | 10/2020 | Yilmazcoban | G06N 3/08 |
| 2021/0110458 | A1* | 4/2021 | Pande | G06Q 30/0643 |
| 2021/0133850 | A1* | 5/2021 | Ayush | G06K 9/6253 |
| 2021/0224582 | A1* | 7/2021 | Afshar | G06K 9/6215 |
| 2021/0233150 | A1* | 7/2021 | Korpeoglu | G06Q 30/0206 |

OTHER PUBLICATIONS

Zaki Mustafa "Image Based Product Recommendation System" May 21, 2020. Retrieved from https://zakim.medium.com/image-based-product-recommendation-e1bfa29e508 (Year: 2020).*

Shuyu Luo "Introduction to Recommender System" Dec. 10, 2018. Retrieved from https://towardsdatascience.com/intro-to-recommender-system-collaborative-filtering-64a238194a26 (Year: 2018).*

Extended European Search Report for European Application No. 21169761.0, dated Sep. 28, 2021, 8 pages.

* cited by examiner

ARRANGING INFORMATION DESCRIBING ITEMS WITHIN A PAGE MAINTAINED IN AN ONLINE SYSTEM BASED ON AN INTERACTION WITH A LINK TO THE PAGE

TECHNICAL FIELD

This disclosure relates generally to online systems, and more specifically to arranging information describing items within a page maintained in an online system based on an interaction with a link to the page.

BACKGROUND

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

To increase awareness among online system users about items (e.g., products) associated with entities (e.g., merchants) having a presence on an online system, content items including images of the items that are presented to the users may include links to pages maintained in the online system that include additional information about the items and allow the users to perform various actions associated with the items. For example, a content item that includes an image of a shirt that a merchant offers for sale also may include a link to a page maintained in an online system that includes additional information about the shirt (e.g., additional images of the shirt, details about colors and sizes of the shirt that are available, etc.). In this example, online system users who are presented with the content item and who interact with the link are directed to the page at which the users may view the additional information about the shirt, purchase the shirt from the merchant, and/or share the page with additional online system users. In the above example, the page also may include similar information about additional products that the merchant offers for sale that the users directed to the page also may purchase from the merchant.

However, online system users who are directed to a page maintained in an online system in response to interacting with a link included in a content item may not become aware of items for which the users are likely to have affinities if information describing these items is not easily accessible to the users. In the above example, suppose that the shirt is a blue dress shirt for men and that information describing other types of clothing and shoes is also presented in the page to which a user is directed upon interacting with the link. In this example, even if additional shirts of a similar style for which the user is likely to have an affinity may be purchased from the merchant via the page, the user may not become aware of them if the user is required to scroll and/or sort through information describing several other items before being able to view information describing these shirts. Although an entity associated with items described in a page maintained in an online system may specify which items are related to each other so that similar items may be grouped together within the page, this may be a time-consuming and resource-intensive process, especially if the entity is associated with several items. Furthermore, the entity may be required to update this information each time new items are added to or removed from the page.

SUMMARY

To increase awareness among online system users about items associated with entities having a presence on an online system, content items including images of the items that are presented to the users may include links to pages maintained in the online system that include additional information about the items and allow the users to perform various actions associated with the items. However, the users may not become aware of items for which they are likely to have affinities if information describing these items is not easily accessible to the users within a page maintained in the online system to which the users are directed in response to interacting with a link included in a content item. Although information describing similar items may be grouped together within the page if an entity associated with the items specifies which items are related to each other, this may be a time-consuming and resource-intensive process, especially if the entity is associated with several items. Furthermore, this information may be required to be updated as new items are added to or removed from the page.

To address this issue, an online system arranges information describing items within a page maintained in the online system based on an interaction with a link to the page. More specifically, the online system receives information describing one or more items associated with an entity having a presence on the online system, in which the information includes one or more images of each item. The online system also receives a content item to be presented to one or more viewing users of the online system, in which the content item includes an image. The online system accesses a trained machine-learning model that is trained based on the information describing the item(s). The online system then applies the trained machine-learning model to a set of attributes of the content item to predict a probability that the content item includes an image of a "subject item" associated with the entity and determines whether the predicted probability is at least a threshold probability. In response to determining that the predicted probability is at least the threshold probability, the online system adds a link to the content item. The link added to the content item corresponds to a page associated with the subject item that is maintained in the online system and includes a set of the information describing the item(s). Upon determining an opportunity to present content to a viewing user of the online system, the online system sends the content item including the link for display to the viewing user. In response to receiving an interaction with the link from the viewing user, the online system determines a measure of similarity between the subject item and each additional item included among the one or more items based on the information describing the item(s). The online system then arranges the set of the information describing the item(s) within the page based on the measure of similarity between the subject item and each additional item and sends the page for display to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
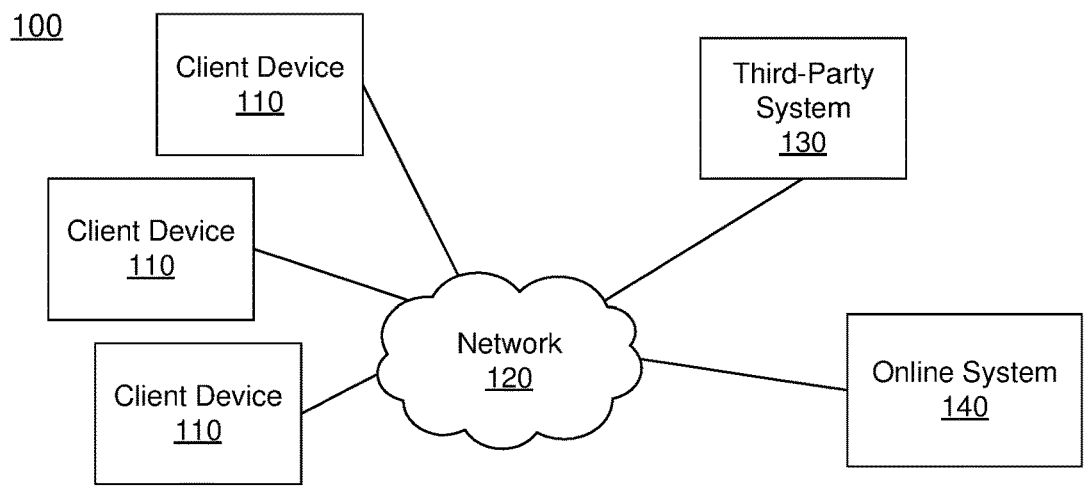
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
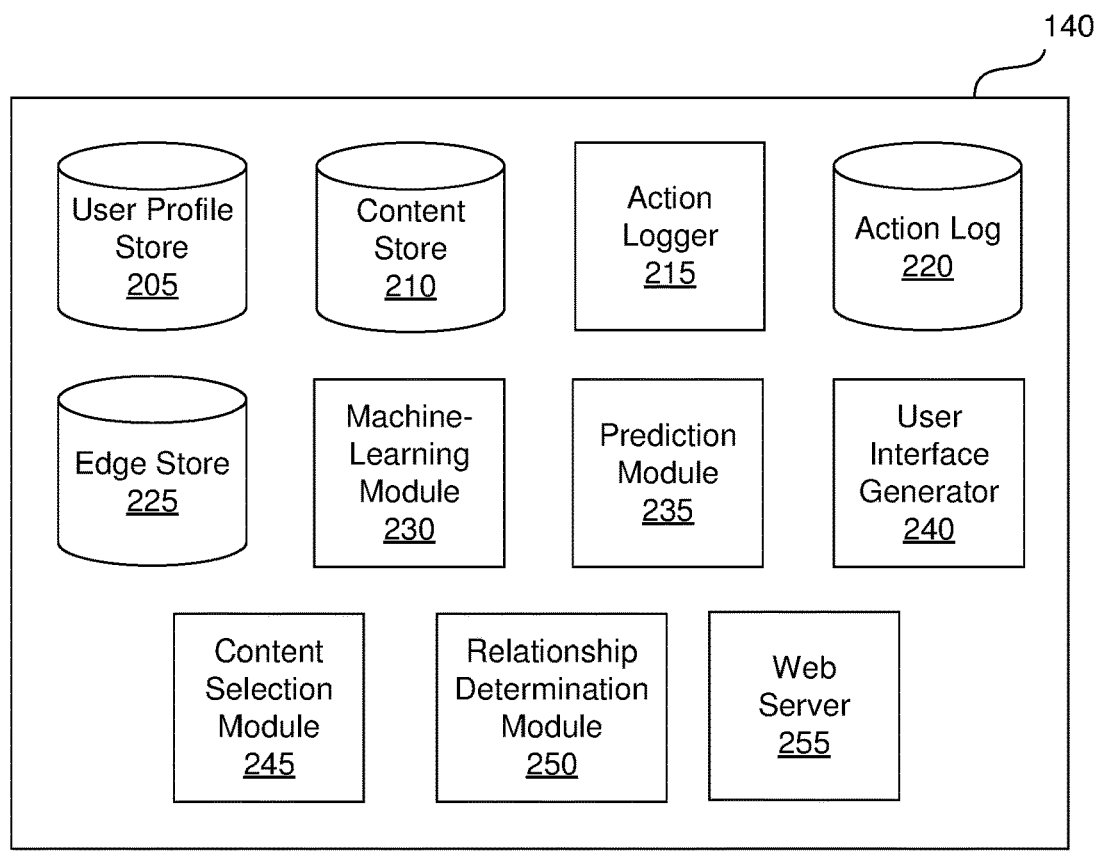
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a machine-learning module 230, a prediction module 235, a user interface generator 240, a content selection module 245, a relationship determination module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 also may store information describing one or more items associated with one or more entities having a presence on the online system 140. In some embodiments, the items may include products, such as clothing items, shoes, electronics, cars, furniture, etc., digital items, such as music, movies, games, applications, etc., or any other suitable types of items. In various embodiments, entities associated with the items may include merchants of the items, manufacturers/creators of the items, distributors of the items, or any other suitable types of entities that may be associated with the items. Information stored in the content store 210 describing an item may include one or more images of the item, a brand or an artist associated with the item, a type of the item, a style or a genre associated with the item, a version or a model associated with the item, a color associated with the item, a material or a set of specifications associated with the item, a price associated with the item, or any other suitable types of information that may be associated with the item. For example, if an item corresponds to a specific pair of running shoes, information describing the running shoes stored in the content store 210 may include one or more images of the shoes, a brand of the shoes, information indicating that the item is a type of shoe, information indicating that the style of the shoes corresponds to running shoes, information describing one or more colors of the shoes, information describing one or more materials of the shoes (e.g., leather, cloth, rubber, etc.), and a retail price of the shoes. Information describing an item may be received from an entity having a presence on the online system 140 associated with the item. In the above example, information describing the running shoes may be received from an entity corresponding to a manufacturer of the running shoes.

In some embodiments, information stored in the content store 210 describing items associated with entities having a presence on the online system 140 may be represented by embeddings generated by the relationship determination module 250, as described below. In such embodiments, each embedding in an embedding space associated with an entity having a presence on the online system 140 may correspond to an item associated with the entity, in which embeddings that are closer together represent items that are more closely related than embeddings that are further apart. For example, suppose that a first embedding in an embedding space corresponds to a white cotton turtleneck sweater associated with an entity and that a second embedding in the embedding space corresponds to a white cotton crewneck sweater associated with the entity. In this example, since the first embedding and the second embedding correspond to items of clothing of the same type (i.e., sweaters), material, and color, the embeddings may be closer together in the embedding space than they are to embeddings corresponding to other types of clothing items associated with the entity (e.g., pants, outerwear, etc.) of different materials and colors. In the above example, embeddings corresponding to types of clothing items associated with the entity also may be closer together in the embedding space than they are to embeddings corresponding to other types of non-clothing items associated with the entity (e.g., shoes, accessories, etc.).

In some embodiments, the content store 210 may store information describing one or more categories associated with items that are associated with entities having a presence on the online system 140. A category associated with an item may be determined by the relationship determination module 250 based on information describing the item, as described below. For example, suppose that an item corresponds to a pair of $99.99 white leather sandals by Brand A. In this example, information stored in the content store 210 may include information describing one or more categories associated with the item, such as a brand of the item (i.e., Brand A), a type of the item (i.e., shoes), a style of the item (i.e., sandals), a color of the item (i.e., white), a material of the item (i.e., leather), and/or a price of the item (i.e., $99.99). Information describing a category stored in the content store 210 also may include more specific categories (i.e., subcategories). In the above example, the category of shoes may include additional categories that are more specific than the category of shoes (e.g., styles of shoes, colors of shoes, materials of shoes, prices of shoes, etc.). In embodiments in which the content store 210 stores information describing an item, information describing one or more categories associated with the item may be stored in association with the information describing the item.

In some embodiments, information stored in the content store 210 describing one or more categories associated with items that are associated with entities having a presence on the online system 140 may be arranged in one or more hierarchies of categories generated by the relationship determination module 250, as described below. In such embodiments, a hierarchy of categories includes multiple nodes representing the categories and edges connecting the nodes represent relationships between the categories, in which items associated with categories corresponding to nodes that are closer together are more closely related than items associated with categories corresponding to nodes that are further apart. Furthermore, different levels of a hierarchy represent different levels of specificity, such that categories represented by nodes at a lowest level of the hierarchy correspond to a most specific level of specificity and categories represented by nodes at a highest level of the hierarchy correspond to a most general level of specificity. For example, suppose that in a hierarchy of categories, a node at a highest level of the hierarchy represents the category of a brand. In this example, each additional node connected by an edge to a node at a higher level of the hierarchy may represent a more specific category (e.g., a type of an item, a style of an item, a color of an item, a material of an item, a price of an item, etc.) within a category corresponding to the node at the higher level to which it is connected. The content store 210 is further described below in conjunction with FIG. 3.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The machine-learning module 230 may train a machine-learning model to predict a probability that a content item includes an image of an item associated with an entity having a presence on the online system 140. As described above, examples of items include products, such as clothing items, shoes, electronics, cars, furniture, etc., digital items, such as music, movies, games, applications, etc., while entities associated with the items may include merchants of the items, manufacturers/creators of the items, distributors of the items, etc. The machine-learning model may be a convolutional neural network, a deep learning model, or any other suitable machine-learning model. In some embodiments, the machine-learning module 230 may train multiple machine-learning models that collectively predict a probability that a content item includes an image of an item associated with an entity having a presence on the online system 140.

In some embodiments, the machine-learning module 230 may train the machine-learning model based on a set of training data received from one or more entities having a presence on the online system 140. In such embodiments, the set of training data may include information describing one or more items associated with each entity, as well as information describing one or more items that are not associated with an entity having a presence on the online system 140. Information describing each item included among the set of training data may include one or more images of the item, a brand or an artist associated with the item, a type of the item, a style or a genre associated with the item, a version or a model associated with the item, a color associated with the item, a material or a set of specifications associated with the item, a price associated with the item, or any other suitable types of information that may be associated with the item. In embodiments in which the set of training data includes an image of an item, the machine-learning model may be trained based on a set of pixel values associated with the image (e.g., a set of pixel values describing a size of the image, a resolution of the image, a brightness of one or more pixels within the image, red, green and blue color component intensities of one or more pixels within the image, etc.).

In some embodiments, the machine-learning module 230 also may train the machine-learning model based on additional types of information. In various embodiments, the machine-learning module 230 also may train the machine-learning model based on a set of attributes of each of a training set of content items, as well as information indicating whether each of the training set of content items includes an image corresponding to an item associated with an entity having a presence on the online system 140. Examples of attributes of a content item include a set of pixel values associated with an image included in the content item, a tag included in the content item, a caption included in the content item, a location associated with the content item, a comment on the content item, an audience associated with the content item, an inferred relationship between the content item and a topic, etc.

In some embodiments, once trained, the machine-learning model may first detect one or more objects within an image included in a content item (e.g., an image included in one or more frames of a video included in the content item). The machine-learning model may do so by applying one or more object detection methods to the image. The machine-learning model also may identify locations of objects detected within an image (e.g., by generating a bounding box surrounding each object). In some embodiments, the machine-learning model uses one or more object detection methods to detect objects within an image and to generate bounding boxes corresponding to each of the detected objects. When detecting objects included in an image, the machine-learning model also may identify a category or a type (e.g., a category or a type associated with a product or other item) corresponding to each object detected within the image based on attributes of the object. For example, an object detection method applied by the machine-learning model associates different categories or types with objects based on attributes of the objects and the machine-learning model associates a category or a type from the object detection method with a detected object. In this example, if an object detected within an image corresponds to a sports car of a specific make and model, based on attributes of the object (e.g., headlights, a windshield, four wheels, one or more side-view mirrors, etc.), an object detection method applied by the machine-learning model may associate the object with the category/type corresponding to cars.

In embodiments in which the machine-learning model identifies a category or a type associated with each object detected within an image included in a content item, the machine-learning module 230 may train the machine-learning model based on a training set of images including images of items associated with different categories or types. In some embodiments, the training set of images may include publicly available information identifying different categories or types associated with images of various items. The machine-learning model also may be trained based on attributes that characterize each of the training set of images, as well as information indicating a category or a type associated with an item corresponding to each of the training set of images. Examples of attributes that characterize an image include shapes, edges, curves, textures, etc. detected within the image, components of various categories or types of items (e.g., surfaces, handles, wheels, fasteners, etc.), or any other suitable attributes that may characterize an image.

In some embodiments, once trained, the machine-learning model also may make one or more predictions that each correspond to a probability that an object detected within an image included in a content item corresponds to a specific item associated with an entity having a presence on the online system 140. The machine-learning model may make each prediction by comparing each object detected within an image to images of items (e.g., images of products included in a product catalog) associated with one or more entities having a presence on the online system 140. The machine-learning model then outputs one or more probabilities that each object detected within an image included in a content item matches different items associated with one or more entities having a presence on the online system 140.

In embodiments in which the machine-learning model predicts a probability that an object detected within an image corresponds to a specific item associated with an entity having a presence on the online system 140, the machine-learning module 230 may train the machine-learning model based on comparisons of objects detected within images to images of items associated with one or more entities having a presence on the online system 140. In some embodiments, the machine-learning module 230 trains the machine-learning model to predict a probability that an object detected within an image matches an item associated with an entity having a presence on the online system 140 based on prior matching of objects detected within images to different items associated with entities having a presence on the online system 140. For example, the machine-learning module 230 applies a label to an object detected within an image indicating that the object matches an item associated with an entity based on attributes of the object (e.g., logos, trademarks, emblems, icons, patterns, prints, etc.). From the labeled attributes of objects extracted from images, the machine-learning module 230 trains the machine-learning model using any suitable training method or combination of training methods (e.g., back propagation if the machine-learning model is a neural network, curve fitting techniques if the machine-learning model is a linear regression model, etc.). The functionality of the machine-learning module 230 is further described below in conjunction with FIG. 3.

The prediction module 235 accesses (e.g., as shown in step 315 of FIG. 3) a trained machine-learning model and applies (e.g., as shown in step 320 of FIG. 3) the machine-learning model to a set of attributes of a content item to predict a probability that the content item includes an image of an item associated with an entity having a presence on the online system 140. In some embodiments, the machine-learning model may be trained by the machine-learning module 230, while in other embodiments, the machine-learning model may be trained by a third-party system 130. To apply the machine-learning model, the prediction module 235 provides an input to the machine-learning model that includes a set of attributes of a content item. Examples of attributes of the content item that may be included in the input include a set of pixel values associated with an image included in the content item, a tag included in the content item, a link included in the content item, a caption included in the content item, a location associated with the content item, a comment on the content item, an audience associated with the content item, an inferred relationship between the content item and a topic, etc. Based on the set of attributes, the machine-learning model predicts a probability that the content item includes an image of an item associated with an entity having a presence on the online system 140. The prediction module 235 then receives an output from the machine-learning model corresponding to the predicted probability. In some embodiments, the prediction module 235 may access and apply multiple machine-learning models that collectively predict a probability that a content item includes an image of an item associated with an entity having a presence on the online system 140 in an analogous manner.

The prediction module 235 also determines (e.g., as shown in step 325 of FIG. 3) whether a probability that a content item includes an image of an item associated with an entity having a presence on the online system 140 predicted by the machine-learning model is at least a threshold probability. In some embodiments, the prediction module 235 may do so by comparing the predicted probability to the threshold probability. For example, suppose that an output received by the prediction module 235 from the machine-learning model corresponds to an 85.1% probability that a content item includes an image of an item associated with an entity having a presence on the online system 140. In this example, if the threshold probability corresponds to an 85% probability, the prediction module 235 determines that the predicted probability is at least the threshold probability since 85.1% is equal to or greater than 85%. Alternatively, in the above example, if the output received by the prediction module 235 from the machine-learning model corresponds to an 84% probability, the prediction module 235 determines that the predicted probability is less than the threshold probability since 84% is not equal to or greater than 85%. The functionality of the prediction module 235 is further described below in conjunction with FIG. 3.

The user interface generator 240 adds (e.g., as shown in step 330 of FIG. 3) a link to a content item. In some embodiments, the user interface generator 240 alternatively may add a button that acts as the link. The link may correspond to a page maintained in the online system 140 and may be associated with an item that is associated with an entity having a presence on the online system 140. Furthermore, the page also may include information describing one or more items associated with the entity. As described above, information describing an item associated with an entity may include one or more images of the item, a brand or an artist associated with the item, a type of the item, a style or a genre associated with the item, a version or a model associated with the item, a color associated with the item, a material or a set of specifications associated with the item, a price associated with the item, etc.

In some embodiments, a page corresponding to a link added to a content item by the user interface generator 240 also may include one or more interactive elements (e.g., buttons, scroll bars, etc.) that allow a viewing user of the online system 140 to view information describing one or more items associated with an entity within the page and/or to perform various actions associated with the item(s). For example, suppose that an item associated with a page corresponding to a link added to a content item by the user interface generator corresponds to a t-shirt associated with an entity having a presence on the online system 140 and that information describing the t-shirt included in the page includes a brand of the t-shirt, a name or a model of the t-shirt, a price of the t-shirt, etc. Continuing with this example, a viewing user of the online system 140 presented with the page may view additional information (e.g., materials, care instructions, reviews, etc.) about the t-shirt by clicking on a button (e.g., a button labeled "more details") associated with the t-shirt and may add the t-shirt to a cart by clicking on an additional button (e.g., a button labeled "add to cart") associated with the t-shirt. In the above example, the viewing user also may interact with a scroll bar to view information describing additional items (e.g., additional t-shirts) associated with the entity within the page.

The user interface generator 240 also arranges (e.g., as shown in step 350 of FIG. 3) information describing one or more items associated with an entity having a presence on the online system 140 within a page maintained in the online system 140, in which the page is associated with an item that is associated with the entity. The user interface generator 240 may arrange the information based on a measure of similarity between the item associated with the page and each additional item associated with the entity, such that items that are more similar to the item associated with the page are in a more prominent position within an area of the page than items that are not as similar to the item associated with the page. In the above example, since the item associated with the page maintained in the online system 140 corresponds to a t-shirt, the user interface generator 240 may arrange information describing additional items associated with the entity within the page based on a measure of similarity of each additional item to the t-shirt (e.g., by ranking the additional items based on how similar they are to the t-shirt). In this example, information describing items associated with the entity that are most similar to the t-shirt (e.g., other t-shirts of a similar fit, color, pattern, etc.) may be arranged in more prominent positions of an area of the page than information describing other items associated with the entity that are not as similar to the t-shirt.

In some embodiments, the user interface generator 240 also or alternatively may include information describing a set of items associated with an entity in a page maintained in the online system 140 only if each item has at least a threshold measure of similarity to an item that is associated with both the entity and the page. For example, if three out of six items associated with an entity having a presence on the online system 140 have at least a threshold measure of similarity to an item associated with both the entity and a page maintained in the online system 140, the user interface generator 240 may include only the information describing the three items within the page. In the above example, the user interface generator 240 also may arrange the information describing the three items based on a measure of similarity between the item associated with the page and each of the three items associated with the entity, such that items that are more similar to the item associated with the page are in more prominent positions within an area of the page than items that are less similar to the item associated with the page. The functionality of the user interface generator 240 is further described below in conjunction with FIGS. 3 and 6.

The content selection module 245 may identify one or more candidate content items eligible for presentation to a viewing user of the online system 140. Candidate content items eligible for presentation to the viewing user are retrieved from the content store 210 or from another source by the content selection module 245, which may rank the candidate content items and select one or more of the candidate content items for presentation to the viewing user. A candidate content item eligible for presentation to a viewing user is a content item associated with at least a threshold number of targeting criteria satisfied by characteristics of the viewing user or is a content item that is not associated with targeting criteria. In various embodiments, the content selection module 245 includes candidate content items eligible for presentation to a viewing user in one or more content selection processes, which identify a set of content items for presentation to the viewing user. For example, the content selection module 245 determines measures of relevance of various candidate content items to a viewing user based on characteristics associated with the viewing user by the online system 140 and based on the viewing user's affinity for different candidate content items. Based on the measures of relevance, the content selection module 245 selects content items for presentation to the viewing user. As an additional example, the content selection module 245 selects content items having the highest measures of relevance or having at least a threshold measure of relevance for presentation to a viewing user. Alternatively, the content selection module 245 ranks candidate content items based on their associated measures of relevance and selects content items having the highest positions in the ranking or having at least a threshold position in the ranking for presentation to a viewing user.

Content items selected for presentation to a viewing user may be associated with bid amounts. The content selection module 245 may use the bid amounts associated with candidate content items when selecting content for presentation to the viewing user. In various embodiments, the content selection module 245 determines an expected value associated with various candidate content items based on their bid amounts and selects content items associated with a maximum expected value or associated with at least a threshold expected value for presentation to a viewing user. An expected value associated with a candidate content item represents an expected amount of compensation to the online system 140 for presenting the candidate content item. For example, the expected value associated with a candidate content item is a product of the candidate content item's bid amount and a likelihood of a viewing user interacting with content from the candidate content item. The content selection module 245 may rank candidate content items based on their associated bid amounts and select content items having at least a threshold position in the ranking for presentation to a viewing user. In some embodiments, the content selection module 245 ranks both candidate content items not associated with bid amounts and candidate content items associated with bid amounts in a unified ranking based on bid amounts and measures of relevance associated with the candidate content items. Based on the unified ranking, the content selection module 245 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 245 receives a request to present a feed of content to a viewing user of the online system 140. The feed may include one or more advertisements as well as other content items, such as stories describing actions associated with other online system users connected to the viewing user. The content selection module 245 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 245 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 245 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the content selection module 245 presents content to a viewing user through a newsfeed including a plurality of content items selected for presentation to the viewing user. One or more advertisements also may be included in the feed. The content selection module 245 may also determine the order in which selected content items are presented via the feed. For example, the content selection module 245 orders content items in a feed based on likelihoods of a viewing user interacting with various content items. The functionality of the content selection module 245 is further described below in conjunction with FIG. 3.

The relationship determination module 250 determines (e.g., as shown in step 345 of FIG. 3) a measure of similarity between an item associated with an entity having a presence on the online system 140 and one or more additional items associated with the entity. The relationship determination module 250 may determine the measure of similarity based on information describing the items. As described above, information describing an item associated with an entity may include one or more images of the item, a brand or an artist associated with the item, a type of the item, a style or a genre associated with the item, a version or a model associated with the item, a color associated with the item, a material or a set of specifications associated with the item, a price associated with the item, etc. For example, suppose that an item associated with an entity having a presence on the online system 140 corresponds to a pair of skis and that information describing the item indicates that the skis are a type of sporting equipment for winter sports. In this example, suppose also that additional items associated with the entity include a painting and a pair of goggles and that information describing the additional items indicate that the painting is a home décor item while the pair of goggles also are a type of sporting equipment for winter sports. In the above example, based on the information describing each item associated with the entity, the relationship determination module 250 may determine that there is a greater measure of similarity between the skis and the goggles than between the skis and the painting.

In some embodiments, the relationship determination module 250 may determine a measure of similarity between items associated with an entity having a presence on the online system 140 based on distances between embeddings in an embedding space associated with the entity, in which each embedding corresponds to an item associated with the entity. In such embodiments, the relationship determination module 250 may generate an embedding corresponding to an item associated with the entity based on information describing the item (e.g., one or more images of the item, a brand or an artist associated with the item, a type of the item, a style or a genre associated with the item, a version or a model associated with the item, a color associated with the item, a material or a set of specifications associated with the item, a price associated with the item, etc.). In some embodiments, the relationship determination module 250 also may store an embedding corresponding to an item that is associated with an entity having a presence on the online system 140 in the content store 210. The relationship determination module 250 may determine a measure of similarity between two items associated with an entity having a presence on the online system 140 by identifying embeddings corresponding to each item within an embedding space associated with the entity and determining the measure of similarity between the items based on a distance between the embeddings, such that the measure of similarity between the items is inversely proportional to the distance between the embeddings.

In some embodiments, the relationship determination module 250 may generate a hierarchy of categories associated with one or more items associated with an entity having a presence on the online system 140. In such embodiments, the relationship determination module 250 may do so based on information describing each item (e.g., one or more images of each item, a brand or an artist associated with each item, a type of each item, a style or a genre associated with each item, a version or a model associated with each item, a color associated with each item, a material or a set of specifications associated with each item, a price associated with each item, etc.). In various embodiments, the relationship determination module 250 also may store a hierarchy of categories in the content store 210. In some embodiments, the relationship determination module 250 may determine a set of metadata associated with each item based on the information describing the item. In such embodiments, the set of metadata associated with each item may correspond to a set of categories associated with the item. Furthermore, in such embodiments, the relationship determination module 250 may then generate the hierarchy of categories based on the set of metadata associated with each item. For example, suppose that information describing an item associated with an entity having a presence on the online system 140 indicates that a color of the item is "midnight." In this example, based on reviews of the item mentioning the color "black" and a set of pixel values associated with one or more images of the item, a set of metadata associated with the item determined by the relationship determination module 250 may indicate that the color of the item is black. In this example, once the relationship determination module 250 has determined a set of metadata associated with each additional item associated with the entity based on information describing the corresponding item, the relationship determination module 250 may then generate a hierarchy of categories based on the set of metadata associated with each item.

In embodiments in which the relationship determination module 250 generates a hierarchy of categories associated with one or more items associated with an entity having a presence on the online system 140, the relationship determination module 250 may determine a measure of similarity between items associated with the entity based on distances between nodes corresponding to categories associated with the items. To do so, the relationship determination module 250 may identify a node corresponding to a category of the hierarchy of categories associated with each item based on information describing the item and determine a measure of similarity between the items based on a distance between the nodes. For example, to determine a measure of similarity between two items associated with an entity having a presence on the online system 140, the relationship determination module 250 accesses a hierarchy of categories associated with items that are associated with the entity. In this example, the relationship determination module 250 then identifies a node corresponding to a category associated with each item based on a set of information describing the corresponding item and determines a distance between the nodes (e.g., a minimum number of nodes and/or edges connecting the nodes). Continuing with this example, the relationship determination module 250 may then determine a measure of similarity between the items based on the distance, such that the measure of similarity between the items is inversely proportional to the distance.

In some embodiments, the relationship determination module 250 may identify a set of items associated with an entity having a presence on the online system 140 that have at least a threshold measure of similarity to an additional item associated with the entity based on a measure of similarity between each item associated with the entity and the additional item. In embodiments in which the relationship determination module 250 generates embeddings in an embedding space associated with the entity, the relationship determination module 250 may do so by identifying an embedding corresponding to the additional item, as well as a set of embeddings that are within a threshold distance of this embedding. In such embodiments, the relationship determination module 250 may identify the set of items that have at least a threshold measure of similarity to the additional item by identifying the set of items corresponding to the set of embeddings. In embodiments in which the relationship determination module 250 generates a hierarchy of categories associated with one or more items associated with the entity, the relationship determination module 250 may identify a set of items associated with the entity having at least a threshold measure of similarity to an additional item associated with the entity by identifying a node corresponding to a category associated with the additional item, as well as a set of nodes that are within a threshold distance of this node. In such embodiments, the relationship determination module 250 may identify the set of items that have at least a threshold measure of similarity to the additional item by identifying the set of items associated with categories corresponding to the set of nodes. The functionality of the relationship determination module 250 is further described below in conjunction with FIG. 3.

The web server 255 links the online system 140 via the network 120 to the one or more client devices 110, as well as to the one or more third-party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3:
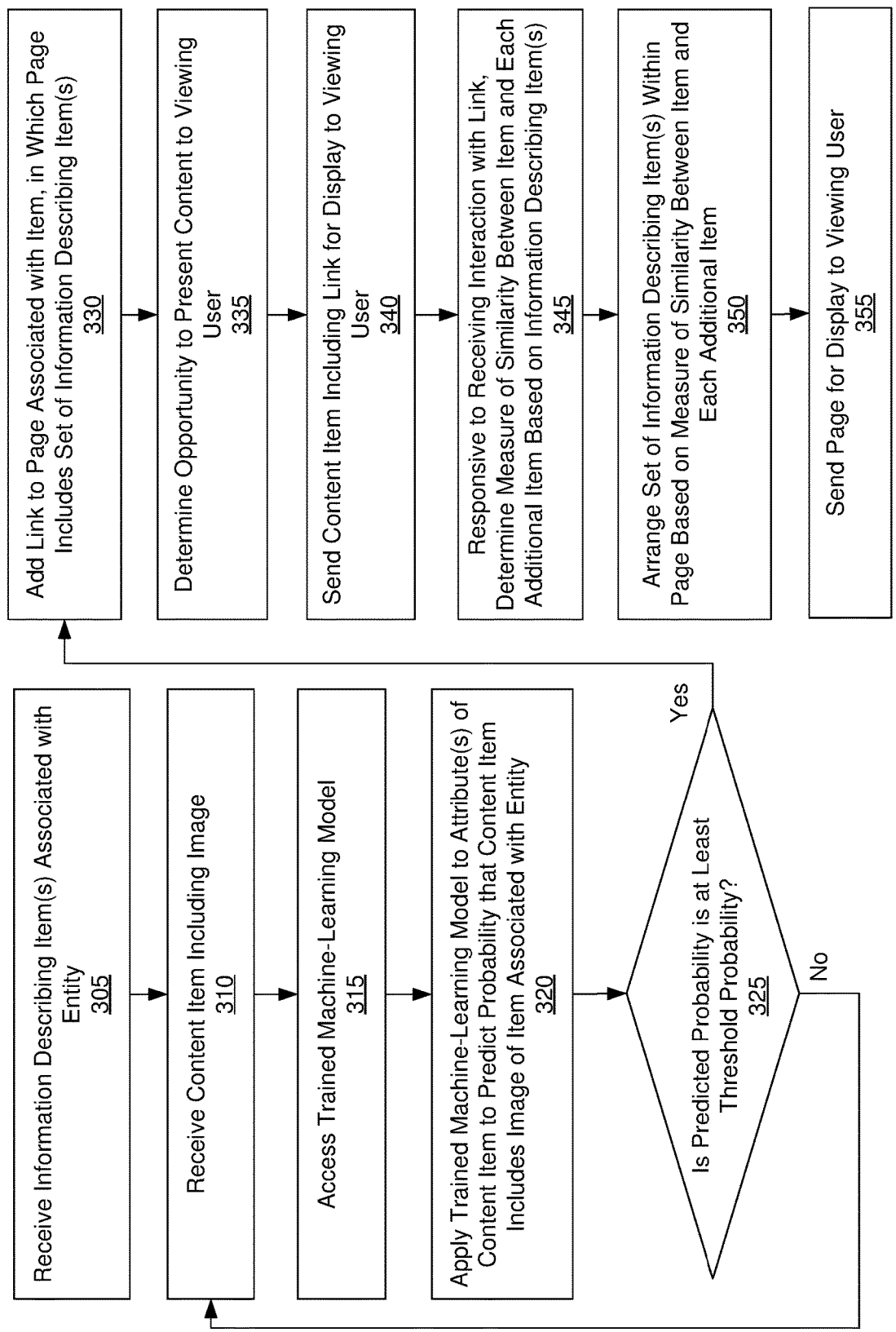
FIG. 3 is a flow chart of a method for arranging information describing items within a page maintained in an online system based on an interaction with a link to the page, in accordance with an embodiment.

Arranging Information Describing Items within a Page Maintained in an Online System Based on an Interaction with a Link to the Page FIG. 3 is a flow chart of a method for arranging information describing items within a page maintained in an online system based on an interaction with a link to the page. In other embodiments, the method may include different and/or additional steps than those shown in FIG. 3. Additionally, steps of the method may be performed in a different order than the order described in conjunction with FIG. 3.

The online system 140 receives 305 information describing one or more items associated with an entity having a presence on the online system 140, in which the information includes one or more images of each item. In some embodiments, the information may be received 305 from the entity (e.g., in a catalog of products). The item(s) may include one or more products, such as clothing items, shoes, electronics, cars, furniture, etc., one or more digital items, such as music, movies, games, applications, etc., or any other suitable types of items. The entity may be a merchant of the item(s), a manufacturer/creator of the item(s), a distributor of the item(s), or any other suitable type of entity that may be associated with the item(s). In addition to one or more images of each item, the information describing the item(s) may include a brand or an artist associated with the item(s), a type of the item(s), a style or a genre associated with the item(s), a version or a model associated with the item(s), a color associated with the item(s), a material or a set of specifications associated with the item(s), a price associated with the item(s), or any other suitable types of information that may be associated with the item(s). For example, if an item corresponds to a specific laptop, information describing the laptop received 305 by the online system 140 may include one or more images of the laptop, a brand of the laptop, information indicating that the item is a type of computer, information indicating that the style of the computer corresponds to a laptop, information describing a color of the laptop, information describing a model of the laptop, a set of specifications associated with the laptop (e.g., screen size, memory, storage, etc.), and a retail price of the laptop.

The online system 140 then receives 310 a content item to be presented to one or more viewing users of the online system 140, in which the content item includes an image. The online system 140 may receive 310 the content item from the entity or from a content-providing user of the online system 140 other than the entity. For example, the online system 140 may receive 310 the content item from the entity, in which the content item includes a caption and an image. In some embodiments, the content item also or alternatively may include additional data, such as video data, audio data, text data (e.g., in one or more tags), one or more additional images, etc. In embodiments in which the content item includes video data, the image may be included in the video data. For example, the image may be included in one or more frames of a video included in the content item received 310 from a content-providing user of the online system 140.

In some embodiments, the online system 140 may receive an interaction with the content item from a viewing user of the online system 140 to whom the content item was presented. Examples of types of interactions include clicking on the content item, expressing a preference for the content item, commenting on the content item, saving the content item, sharing the content item with additional users of the online system 140, unsubscribing to content created by an online system user who created the content item, reporting the content item as inappropriate, etc. For example, the online system 140 may receive a comment on the content item from a viewing user of the online system 140, in which the comment includes text content and emojis describing the viewing user's enthusiasm for the content item.

The online system 140 then accesses 315 (e.g., using the prediction module 235) a trained machine-learning model and applies 320 (e.g., using the prediction module 235) the machine-learning model to a set of attributes of the content item to predict a probability that the content item includes an image of an item associated with the entity (hereinafter referred to as the "subject item"). In some embodiments, the machine-learning model may be trained by the online system 140 (e.g., using the machine-learning module 230), while in other embodiments, the machine-learning model may be trained by a third-party system 130. The machine-learning model may be trained based on a set of training data that includes the information received 305 by the online system 140 describing the item(s) associated with the entity.

To apply 320 the machine-learning model to the set of attributes of the content item to predict the probability that the content item includes an image of the subject item, the online system 140 provides an input to the machine-learning model that includes the set of attributes of the content item. Examples of attributes of the content item that may be included in the input to the machine-learning model include a set of pixel values associated with an image included in the content item, a tag included in the content item, a caption included in the content item, a location associated with the content item, a comment on the content item, an audience associated with the content item, an inferred relationship between the content item and a topic, etc. Based on the set of attributes, the machine-learning model predicts the probability that the content item includes an image of the subject item. The online system 140 then receives an output from the machine-learning model corresponding to the predicted probability. In some embodiments, the online system 140 may access and apply multiple machine-learning models that collectively predict the probability that the content item includes an image of the subject item in an analogous manner.

The online system 140 then determines 325 (e.g., using the prediction module 235) whether the probability predicted by the machine-learning model is at least a threshold probability. In some embodiments, the online system 140 may do so by comparing the predicted probability to the threshold probability. For example, suppose that an output received by the online system 140 from the machine-learning model corresponds to an 85.1% probability that the content item includes an image of the subject item. In this example, if the threshold probability corresponds to an 85% probability, the online system 140 determines 325 that the predicted probability is at least the threshold probability since 85.1% is equal to or greater than 85%. Alternatively, in the above example, if the output received by the online system 140 from the machine-learning model corresponds to an 84% probability, the online system 140 determines 325 that the predicted probability is less than the threshold probability since 84% is not equal to or greater than 85%. In some embodiments, if the online system 140 determines 325 that the probability predicted by the machine-learning model is not at least the threshold probability, the online system 140 may repeat some of the steps described above (e.g., by proceeding back to step 310).

Responsive to determining 325 that the probability predicted by the machine-learning model is at least the threshold probability, the online system 140 adds 330 (e.g., using the user interface generator 240) a link to the content item. In some embodiments, the online system 140 alternatively may add 330 a button that acts as the link. The link added 330 to the content item corresponds to a page maintained in the online system 140. Furthermore, the page is associated with the subject item and includes a set of the information received 305 by the online system 140 describing the item(s) associated with the entity. As described above, information describing an item associated with the entity may include one or more images of the item, a brand or an artist associated with the item, a type of the item, a style or a genre associated with the item, a version or a model associated with the item, a color associated with the item, a material or a set of specifications associated with the item, a price associated with the item, etc.

In some embodiments, the page corresponding to the link added 330 to the content item also may include one or more interactive elements (e.g., buttons, scroll bars, etc.) that allow a viewing user of the online system 140 to view information describing the item(s) associated with the entity within the page and/or to perform various actions associated with the item(s). For example, if the subject item corresponds to a t-shirt, information describing the t-shirt included in the page may include a brand of the t-shirt, a name or a model of the t-shirt, a price of the t-shirt, etc. Continuing with this example, a viewing user of the online system 140 presented with the page may view additional information (e.g., materials, care instructions, reviews, etc.) about the t-shirt by clicking on a button (e.g., a button labeled "more details") associated with the t-shirt and may add the t-shirt to a cart by clicking on an additional button (e.g., a button labeled "add to cart") associated with the t-shirt. In the above example, the viewing user also may interact with a scroll bar to view information describing additional items (e.g., additional t-shirts) associated with the entity within the page.

The online system 140 then determines 335 an opportunity to present content to a viewing user of the online system 140. For example, the online system 140 may determine 335 the opportunity to present content to the viewing user upon receiving a request from the viewing user to view a feed of content items associated with a user profile of the viewing user. As an additional example, the online system 140 may determine 335 the opportunity to present content to the viewing user upon receiving a request from the viewing user to refresh a feed of content items associated with a user profile of the viewing user.

The online system 140 then sends 340 the content item including the link for display to the viewing user. In some embodiments, the content item may be included among one or more content items selected (e.g., using the content selection module 245) for display to the viewing user. In such embodiments, once the online system 140 has selected the content item(s), the online system 140 sends 340 the selected content item(s) for display to the viewing user. For example, the online system 140 may include the selected content item(s) in a feed of content items that is sent 340 for display in a display area of a client device 110 associated with the viewing user.

Responsive to receiving an interaction with the link (or a button that acts as the link) from the viewing user, the online system 140 determines 345 (e.g., using the relationship determination module 250) a measure of similarity between the subject item and each additional item associated with the entity for which the online system 140 received 305 information. The online system 140 may determine 345 the measure of similarity based on the information received 305 by the online system 140. For example, suppose that the subject item corresponds to headphones and that information describing the subject item indicates that the headphones are a type of accessory for electronic devices. In this example, suppose also that additional items associated with the entity include a pair of shorts and an external hard drive and that information describing the additional items indicate that the pair of shorts is a clothing item while the external hard drive also is a type of accessory for electronic devices. In the above example, based on the information describing each item associated with the entity, the online system 140 may determine 345 that there is a greater measure of similarity between the headphones and the external hard drive than between the headphones and the pair of shorts.

In some embodiments, the online system 140 may determine 345 the measure of similarity between the subject item and each additional item associated with the entity based on distances between embeddings in an embedding space associated with the entity, in which each embedding corresponds to an item associated with the entity. In such embodiments, the online system 140 may generate (e.g., using the relationship determination module 250) an embedding corresponding to an item associated with the entity based on information describing the item received 305 by the online system 140. In some embodiments, the online system 140 also may store each embedding corresponding to an item that is associated with the entity (e.g., in the content store 210). The online system 140 may then determine 345 the measure of similarity between the subject item and each of the additional items for which the online system 140 received 305 information by identifying an embedding corresponding to the subject item, as well as an additional embedding corresponding to each additional item. The online system 140 then determines a distance between the embedding and the additional embedding and determines 345 the measure of similarity between the subject item and the additional item based on the distance.

Figure 4:
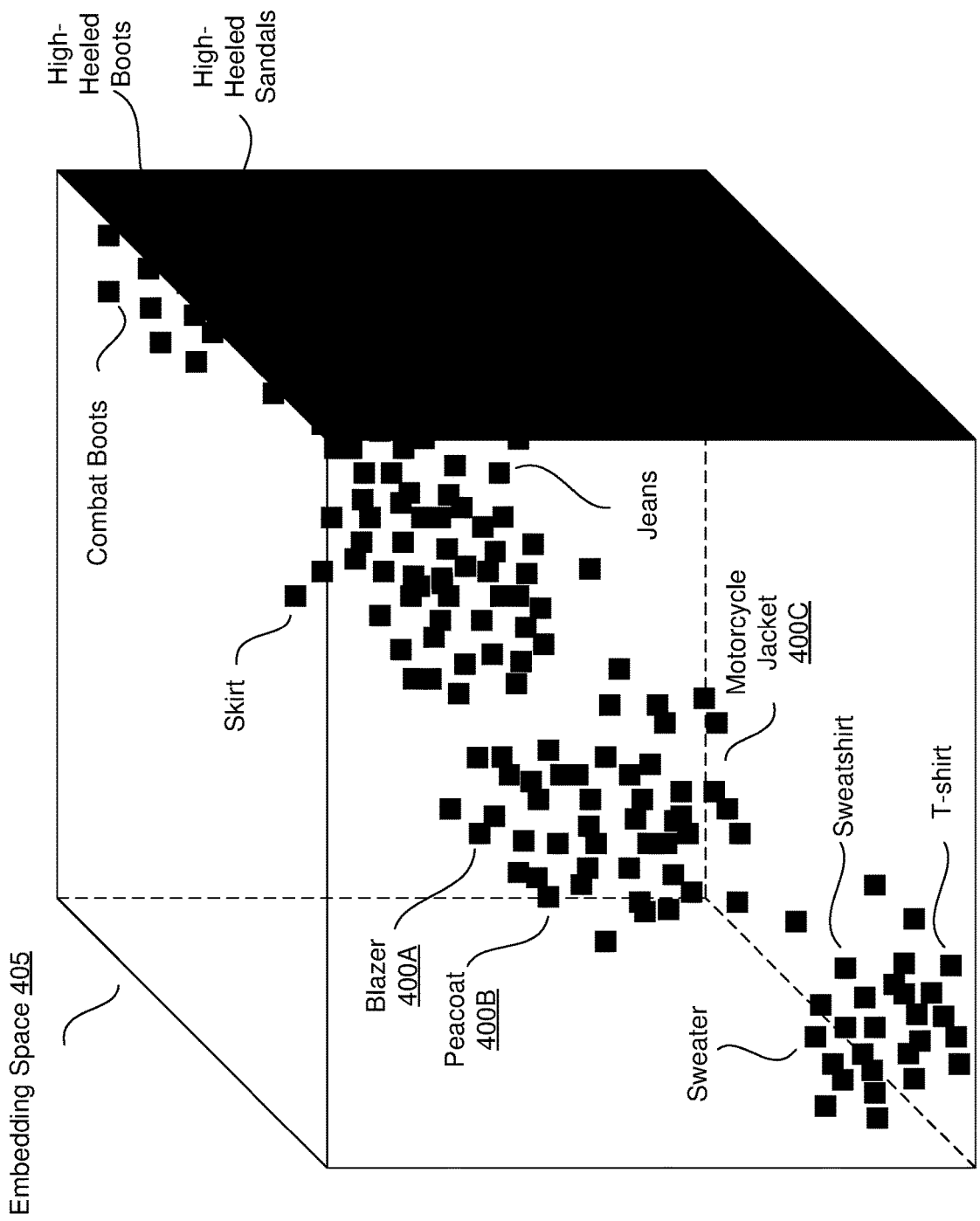
FIG. 4 is an example of an embedding space that includes embeddings corresponding to items that are associated with an entity having a presence on an online system, in accordance with an embodiment.

FIG. 4 illustrates an example of how the online system 140 may determine 345 the measure of similarity between the subject item and each additional item associated with the entity based on distances between embeddings 400 in an embedding space 405 associated with the entity. As shown in FIG. 4, for each item for which the online system 140 received 305 information, the online system 140 generates an embedding 400 in the embedding space 405 based on information describing the corresponding item received 305 by the online system 140. In this example, if the subject item corresponds to a blazer, to determine 345 a measure of similarity between the blazer and an additional item associated with the entity corresponding to a peacoat, the online system 140 identifies an embedding 400A corresponding to the blazer as well as an additional embedding 400B corresponding to the peacoat. Continuing with this example, the online system 140 then determines a distance between the embeddings 400A-B within the embedding space 405 and determines 345 a measure of similarity between the blazer and the peacoat based on the distance between the embeddings 400A-B, such that the measure of similarity between the items is inversely proportional to the distance between the embeddings 400A-B. In this example, the online system 140 may then repeat this process for each additional item associated with the entity. In the above example, since the measure of similarity between two items is inversely proportional to the distance between embeddings 400 corresponding to the items, the blazer has a greater measure of similarity to the peacoat than it does to a motorcycle jacket since the distance between the embedding 400A corresponding to the blazer and the embedding 400B corresponding to the peacoat is shorter than the distance between the embedding 400A corresponding to the blazer and an embedding 400C corresponding to the motorcycle jacket.

In some embodiments, the online system 140 also may determine 345 the measure of similarity between the subject item and each additional item associated with the entity based on distances between nodes in a hierarchy of categories associated with the items, in which each node corresponds to a category that may be associated with one or more items associated with the entity. As described above, the hierarchy of categories includes multiple nodes representing the categories and edges connecting the nodes represent relationships between the categories, in which items associated with categories corresponding to nodes that are closer together are more closely related than items associated with categories corresponding to nodes that are further apart. Furthermore, different levels of the hierarchy of categories represent different levels of specificity, such that categories represented by nodes at a lowest level of the hierarchy correspond to a most specific level of specificity and categories represented by nodes at a highest level of the hierarchy correspond to a most general level of specificity. The online system 140 may generate (e.g., using the relationship determination module 250) the hierarchy of categories based on the information describing the item(s) received 305 by the online system 140. In some embodiments, the online system 140 may determine (e.g., using the relationship determination module 250) a set of metadata associated with each item based on the information describing the item, in which the set of metadata corresponds to a set of categories associated with the item. In such embodiments, the online system 140 may then generate the hierarchy of categories based on the metadata associated with each item. In various embodiments, the online system 140 also may store the hierarchy of categories (e.g., in the content store 210).

Figure 5:
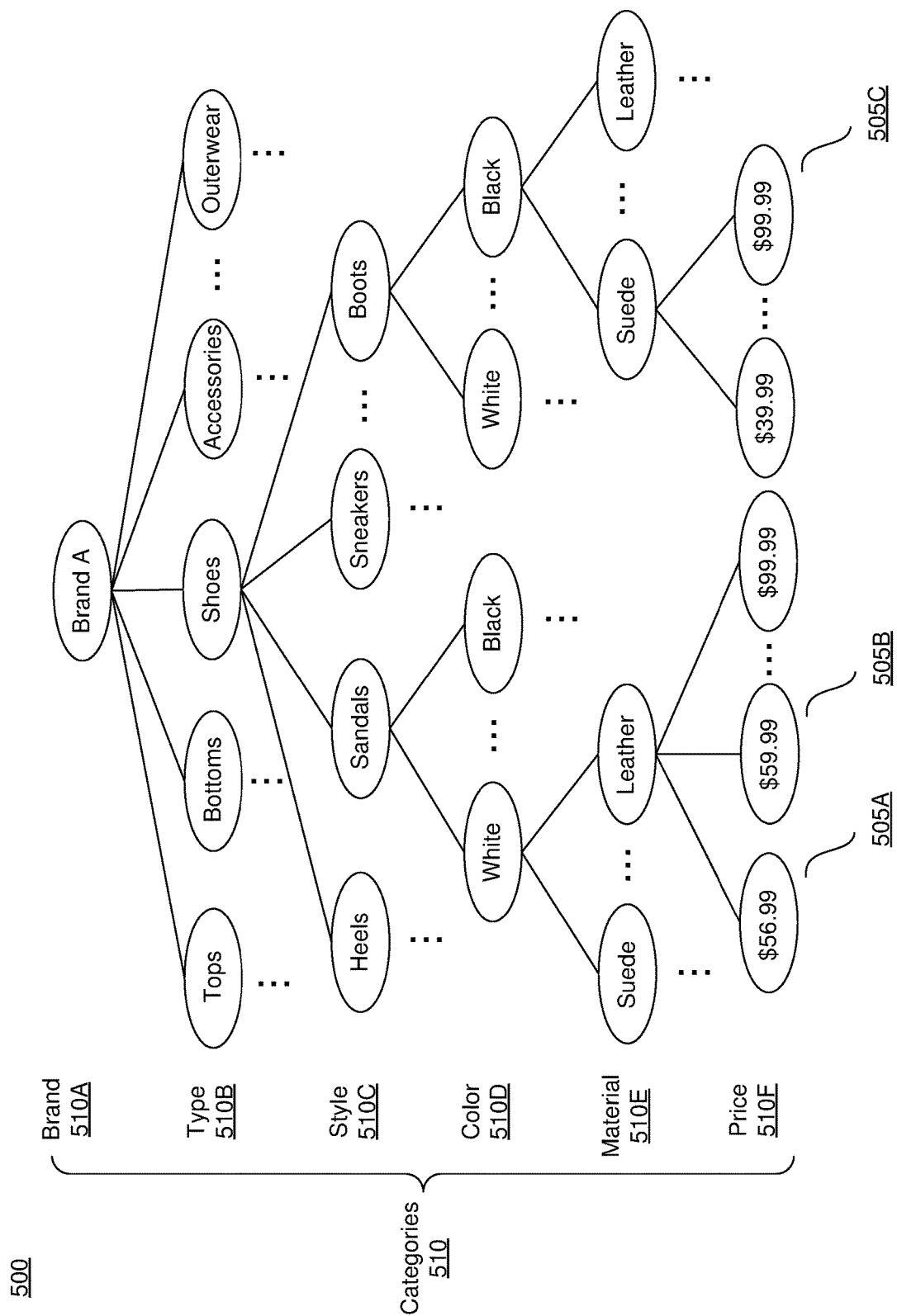
FIG. 5 is an example of a hierarchy of categories associated with items that are associated with an entity having a presence on an online system, in accordance with an embodiment.

FIG. 5 Illustrates an example of a hierarchy of categories that the online system 140 may use to determine 345 the measure of similarity between the subject item and each additional item associated with the entity. As shown in FIG. 5, the hierarchy 505 of categories 510 includes multiple nodes 505, in which each node 505 represents a category 510 (i.e., a brand 510A, a type 510B, a style 510C, a color 510D, a material 510E, and/or a price 510F) and each edge connecting a pair of nodes 505 represents a relationship between categories 510 represented by the pair of nodes 505. In this example, if the subject item corresponds to a $56.99 pair of white leather sandals by Brand A, to determine 345 a measure of similarity between these sandals and a $59.99 pair of white leather sandals by Brand A, the online system 140 identifies a node 505A corresponding to a category 510 associated with the $56.99 pair of white leather sandals by Brand A as well as an additional node 505B corresponding to a category 510 associated with the $59.99 pair of white leather sandals by Brand A. Continuing with this example, the online system 140 then determines a distance between the nodes 505A-B (e.g., a minimum number of nodes 505 and/or edges connecting the nodes 505A-B) and determines 345 a measure of similarity between the sandals based on the distance, such that the measure of similarity between the sandals is inversely proportional to the distance. In the above example, since the measure of similarity between two items is inversely proportional to the distance between nodes 505 corresponding to categories 510 associated with the items, the $56.99 pair of white leather sandals by Brand A has a greater measure of similarity to the $59.99 pair of white leather sandals by Brand A than it does to a $99.99 pair of black suede boots by Brand A since the distance between the nodes 505A-B corresponding to the categories 510 associated with the sandals is shorter than the distance between the node 505A corresponding to the category 510 associated with the $56.99 pair of white leather sandals by Brand A and a node 505C corresponding to a category 510 associated with the boots.

In some embodiments, responsive to receiving an interaction with the link (or a button that acts as the link) from the viewing user, the online system 140 may identify (e.g., using the relationship determination module 250) a set of the item(s) for which the online system 140 received 305 information that have at least a threshold measure of similarity to the subject item. The online system 140 may identify the set of items based on a measure of similarity between the subject item and each additional item associated with the entity. In embodiments in which the online system 140 generates embeddings in an embedding space associated with the entity, the online system 140 may identify an embedding corresponding to the subject item, as well as a set of embeddings that are within a threshold distance of this embedding. In such embodiments, the online system 140 may identify the set of items that have at least the threshold measure of similarity to the subject item by identifying the set of items corresponding to the set of embeddings. In embodiments in which the online system 140 generates a hierarchy of categories associated with one or more items associated with the entity, the online system 140 may identify a node corresponding to a category associated with the subject item, as well as a set of nodes that are within a threshold distance of this node (e.g., such that each of the set of nodes is within a threshold number of nodes and/or edges from the node corresponding to the category associated with the subject item). The online system 140 then identifies the set of items that have at least the threshold measure of similarity to the subject item by identifying the set of items associated with categories corresponding to the set of nodes.

Referring back to FIG. 3, once the online system 140 has determined 345 the measure of similarity between the subject item and each additional item for which the online system 140 received 305 information, the online system 140 arranges 350 (e.g., using the user interface generator 240) a set of the information received 305 by the online system 140 within the page associated with the subject item. The online system 140 arranges 350 the information based on the measure of similarity between the subject item and each additional item associated with the entity. In some embodiments, items that are more similar to the subject item are in a more prominent position within an area of the page than items that are not as similar to the subject item.

Figure 6:
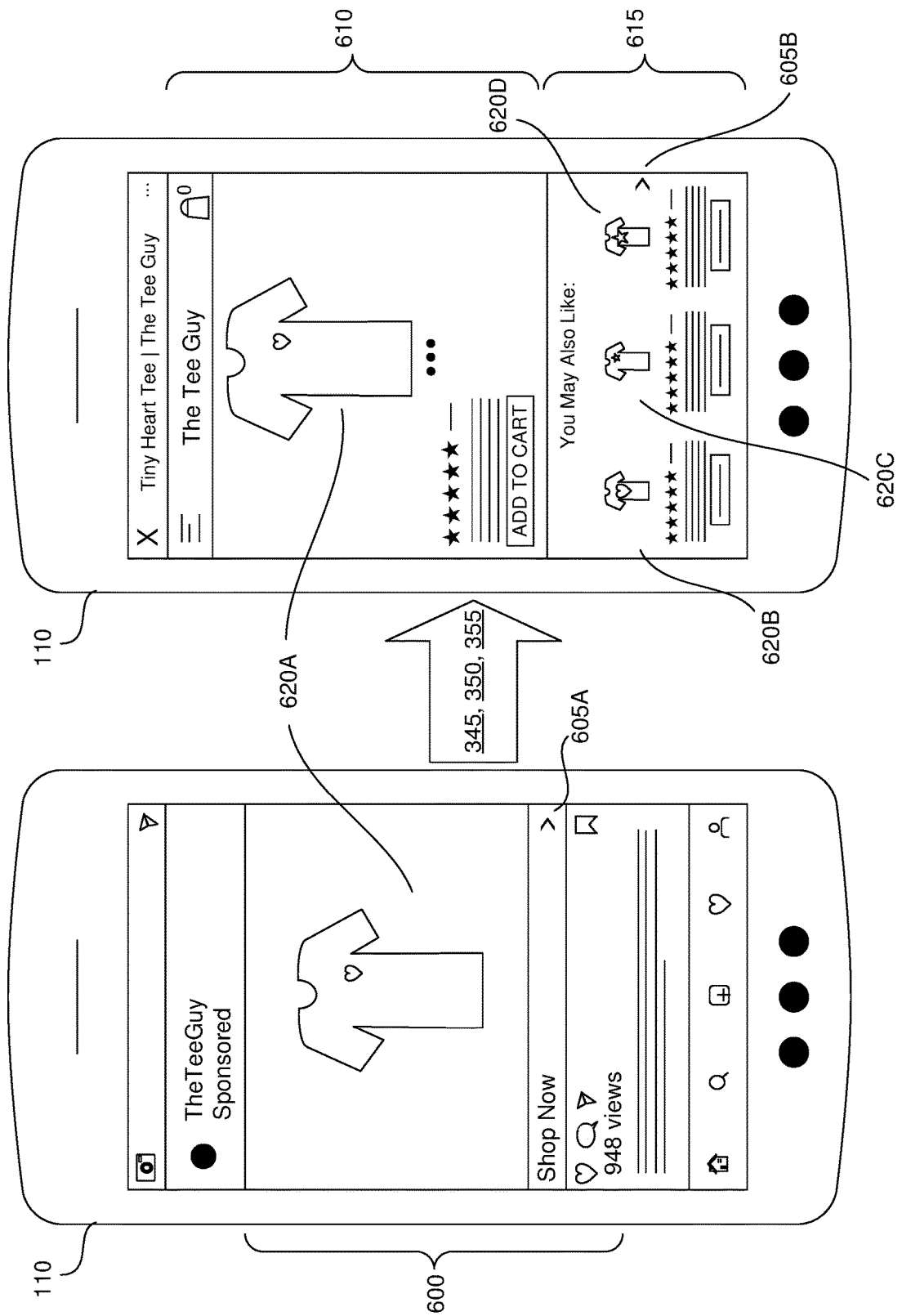
FIG. 6 illustrates an example of arranging a set of information describing items that are associated with an entity having a presence on an online system within a page maintained in the online system based on an interaction with a link to the page, in accordance with an embodiment.

As shown in the example of FIG. 6, suppose that the subject item corresponds to a t-shirt 620A with a small heart design and that after sending 340 the content item 600 including an image of the t-shirt 620A for display in a display area of a client device 110 associated with the viewing user, the online system 140 has received an interaction with a button 605A that acts as the link. In this example, suppose also that the online system 140 has determined 345 the measure of similarity between the t-shirt 620A and each additional item associated with the entity. Continuing with this example, below an area 610 of the page that includes information describing the t-shirt 620A, the online system 140 may arrange 350 information describing additional items 620B-D associated with the entity within an additional area 615 of the page based on a measure of similarity between each additional item 620B-D and the t-shirt 620A (e.g., by ranking the additional items 620B-D based on how similar they are to the t-shirt 620A). In this example, information describing a t-shirt 620B with a large heart design is arranged 350 in a more prominent position of the area 615 of the page than information describing other items associated with the entity that are not as similar to the t-shirt 620A with the small heart design since both the t-shirt 620A with the small heart design and the t-shirt 620B with the large heart design have similar designs. Similarly, in this example, information describing a t-shirt 620C with a small star design is in a more prominent position within the area 615 of the page than information describing a t-shirt 620D with a large star design since both the t-shirt 620A with the small heart design and the t-shirt 620C with the small star design have similar sized designs. As described above, in some embodiments, the page associated with the subject item may include one or more interactive elements. As shown in FIG. 6, the page may include a button 605B with which the viewing user may interact to view information describing additional items (e.g., additional t-shirts) associated with the entity within the page.

In some embodiments, rather than including all of the information describing the item(s) for which the online system 140 received 305 information in the page associated with the subject item, the online system 140 also or alternatively may include (e.g., using the user interface generator 240) only the information that describes a set of the item(s) that have at least a threshold measure of similarity to the subject item. For example, referring back to FIG. 6, suppose that the online system 140 received 305 information describing six items associated with the entity, but the three t-shirts 620B-D are the only items associated with the entity that have at least a threshold measure of similarity to the t-shirt 620A associated with the page maintained in the online system 140. In this example, the online system 140 may include only the information describing the three t-shirts 620B-D within the page. In the above example, the online system 140 also may arrange 350 the information describing the three t-shirts 620B-D based on the measure of similarity between the t-shirt 620A corresponding to the subject item and each of the three t-shirts 620B-D associated with the entity, as described above.

Referring once more to FIG. 3, the online system 140 then sends 355 the page for display to the viewing user. For example, the online system 140 sends 355 the page for display in a display area of a client device 110 associated with the viewing user. As shown in the example of FIG. 6, the page may include an area 610 with information describing the subject item (i.e., the t-shirt 620A), as well as an additional area 615 with information describing additional items (e.g., t-shirts 620B-D) that are arranged 350 based on their measure of similarity to the subject item.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving information describing one or more items associated with an entity having a presence on an online system, the information comprising one or more images of each of the one or more items;
receiving a content item to be presented to one or more viewing users of the online system, the content item comprising an image;
accessing a trained machine-learning model, the trained machine-learning model trained based at least in part on the information describing the one or more items;
applying the trained machine-learning model to a set of attributes of the content item to predict a probability that the content item comprises an image of an item associated with the entity;

determining whether the predicted probability is at least a threshold probability;

responsive to determining that the predicted probability is at least the threshold probability, adding, to the content item, a link to a page associated with the item maintained in the online system, wherein the page comprises a set of the information describing the one or more items;

determining an opportunity to present content to a viewing user of the online system;

sending the content item comprising the link for display to the viewing user;

responsive to receiving an interaction with the link from the viewing user, determining a measure of similarity between the item and each additional item of the one or more items, the measure of similarity determined based at least in part on the information describing the one or more items;

arranging the set of the information describing the one or more items within the page based at least in part on the measure of similarity between the item and each additional item of the one or more items; and sending the page for display to the viewing user.

2. The method of claim 1, wherein the information describing the one or more items comprises one or more of: a color associated with an item of the one or more items, a style associated with an item of the one or more items, a genre associated with an item of the one or more items, a material associated with an item of the one or more items, a type associated with an item of the one or more items, a brand associated with an item of the one or more items, an artist associated with an item of the one or more items, a version associated with an item of the one or more items, a model associated with an item of the one or more items, a set of specifications associated with an item of the one or more items, and a price associated with an item of the one or more items.

3. The method of claim 1, wherein determining the measure of similarity between the item and each additional item of the one or more items comprises:
for each of the one or more items, generating an embedding in an embedding space based at least in part on a set of the information describing a corresponding item;
identifying an embedding corresponding to the item; and
for each additional item of the one or more items:
   identifying an additional embedding corresponding to the additional item,
   determining a distance between the embedding corresponding to the item and the additional embedding corresponding to the additional item, and
   determining the measure of similarity between the item and the additional item based at least in part on the distance.

4. The method of claim 1, wherein determining the measure of similarity between the item and each additional item of the one or more items comprises:
determining a set of metadata associated with each of the one or more items based at least in part on the information describing the one or more items;
generating a hierarchy of categories associated with the one or more items based at least in part on the set of metadata associated with each of the one or more items, the hierarchy of categories comprising a plurality of nodes and one or more edges, wherein each of the plurality of nodes represents a category and each of the one or more edges connecting a pair of the plurality of nodes represents a relationship between a plurality of categories represented by the pair of nodes;
identifying a node corresponding to a category of the hierarchy of categories associated with the item based at least in part on a set of the information describing the item; and
for each additional item of the one or more items:
   identifying an additional node corresponding to an additional category of the hierarchy of categories associated with the additional item based at least in part on a set of the information describing a corresponding item,
   determining a distance between the node corresponding to the category of the hierarchy of categories associated with the item and the additional node corresponding to the additional category of the hierarchy of categories associated with the additional item, and
   determining the measure of similarity between the item and the additional item based at least in part on the distance.

5. The method of claim 1, further comprising:
responsive to receiving the interaction with the link from the viewing user, identifying a set of the one or more items having at least a threshold measure of similarity to the item based at least in part on the measure of similarity between the item and each additional item of the one or more items; and
including information describing the item and the set of the one or more items having at least the threshold measure of similarity to the item in the page.

6. The method of claim 5, wherein identifying the set of the one or more items having at least the threshold measure of similarity to the item comprises:
for each of the one or more items, generating an embedding in an embedding space based at least in part on a set of the information describing a corresponding item;
identifying an embedding corresponding to the item;
identifying a set of embeddings within a threshold distance of the embedding corresponding to the item; and
identifying the set of the one or more items having at least the threshold measure of similarity to the item, wherein the set of the one or more items correspond to the set of embeddings.

7. The method of claim 5, wherein identifying the set of the one or more items having at least the threshold measure of similarity to the item comprises:
determining a set of metadata associated with each of the one or more items based at least in part on the information describing the one or more items;
generating a hierarchy of categories associated with the one or more items based at least in part on the set of metadata associated with each of the one or more items, the hierarchy of categories comprising a plurality of nodes and one or more edges, wherein each of the plurality of nodes represents a category and each of the one or more edges connecting a pair of the plurality of nodes represents a relationship between a plurality of categories represented by the pair of nodes;
identifying a node corresponding to a category of the hierarchy of categories associated with the item based at least in part on a set of the information describing the item;
for each additional item of the one or more items, identifying an additional node corresponding to an additional category of the hierarchy of categories associated with the additional item based at least in part on a set of the information describing a corresponding item;

identifying a set of nodes within a threshold distance of the node corresponding to the category of the hierarchy of categories associated with the item; and identifying the set of the one or more items having at least the threshold measure of similarity to the item, wherein the set of the one or more items correspond to the set of nodes.

8. The method of claim 1, wherein the set of attributes of the content item comprises one or more selected from the group consisting of: a set of pixel values associated with the image comprising the content item, a tag comprising the content item, a link comprising the content item, a caption comprising the content item, a location associated with the content item, a comment on the content item, an audience associated with the content item, an inferred relationship between the content item and a topic, and any combination thereof.

9. The method of claim 1, wherein the content item is received from the entity.

10. The method of claim 1, wherein the content item is received from a content-providing user of the online system other than the entity.

11. A computer program product comprising a non-transitory computer readable storage medium having instructions encoded thereon that, when executed by a processor, cause the processor to:
receive information describing one or more items associated with an entity having a presence on an online system, the information comprising one or more images of each of the one or more items;
receive a content item to be presented to one or more viewing users of the online system, the content item comprising an image;
access a trained machine-learning model, the trained machine-learning model trained based at least in part on the information describing the one or more items;
apply the trained machine-learning model to a set of attributes of the content item to predict a probability that the content item comprises an image of an item associated with the entity;
determine whether the predicted probability is at least a threshold probability;
responsive to determining that the predicted probability is at least the threshold probability, add, to the content item, a link to a page associated with the item maintained in the online system, wherein the page comprises a set of the information describing the one or more items;
determine an opportunity to present content to a viewing user of the online system;
send the content item comprising the link for display to the viewing user;
responsive to receiving an interaction with the link from the viewing user, determine a measure of similarity between the item and each additional item of the one or more items, the measure of similarity determined based at least in part on the information describing the one or more items;
arrange the set of the information describing the one or more items within the page based at least in part on the measure of similarity between the item and each additional item of the one or more items; and
send the page for display to the viewing user.

12. The computer program product of claim 11, wherein the information describing the one or more items comprises one or more of: a color associated with an item of the one or more items, a style associated with an item of the one or more items, a genre associated with an item of the one or more items, a material associated with an item of the one or more items, a type associated with an item of the one or more items, a brand associated with an item of the one or more items, an artist associated with an item of the one or more items, a version associated with an item of the one or more items, a model associated with an item of the one or more items, a set of specifications associated with an item of the one or more items, and a price associated with an item of the one or more items.

13. The computer program product of claim 11, wherein determine the measure of similarity between the item and each additional item of the one or more items comprises:
for each of the one or more items, generate an embedding in an embedding space based at least in part on a set of the information describing a corresponding item;
identify an embedding corresponding to the item; and
for each additional item of the one or more items:
identify an additional embedding corresponding to the additional item,
determine a distance between the embedding corresponding to the item and the additional embedding corresponding to the additional item, and
determine the measure of similarity between the item and the additional item based at least in part on the distance.

14. The computer program product of claim 11, wherein determine the measure of similarity between the item and each additional item of the one or more items comprises:
determine a set of metadata associated with each of the one or more items based at least in part on the information describing the one or more items;
generate a hierarchy of categories associated with the one or more items based at least in part on the set of metadata associated with each of the one or more items, the hierarchy of categories comprising a plurality of nodes and one or more edges, wherein each of the plurality of nodes represents a category and each of the one or more edges connecting a pair of the plurality of nodes represents a relationship between a plurality of categories represented by the pair of nodes;
identify a node corresponding to a category of the hierarchy of categories associated with the item based at least in part on a set of the information describing the item; and
for each additional item of the one or more items:
identify an additional node corresponding to an additional category of the hierarchy of categories associated with the additional item based at least in part on a set of the information describing a corresponding item,
determine a distance between the node corresponding to the category of the hierarchy of categories associated with the item and the additional node corresponding to the additional category of the hierarchy of categories associated with the additional item, and
determine the measure of similarity between the item and the additional item based at least in part on the distance.

15. The computer program product of claim 11, wherein the non-transitory computer-readable storage medium further has instructions encoded thereon that, when executed by the processor, cause the processor to:
responsive to receiving the interaction with the link from the viewing user, identify a set of the one or more items having at least a threshold measure of similarity to the item based at least in part on the measure of similarity between the item and each additional item of the one or more items; and include information describing the item and the set of the one or more items having at least the threshold measure of similarity to the item in the page.

16. The computer program product of claim 15, wherein identify the set of the one or more items having at least the threshold measure of similarity to the item comprises:
for each of the one or more items, generate an embedding in an embedding space based at least in part on a set of the information describing a corresponding item;
identify an embedding corresponding to the item;
identify a set of embeddings within a threshold distance of the embedding corresponding to the item; and
identify the set of the one or more items having at least the threshold measure of similarity to the item, wherein the set of the one or more items correspond to the set of embeddings.

17. The computer program product of claim 15, wherein identify the set of the one or more items having at least the threshold measure of similarity to the item comprises:
determine a set of metadata associated with each of the one or more items based at least in part on the information describing the one or more items;
generate a hierarchy of categories associated with the one or more items based at least in part on the set of metadata associated with each of the one or more items, the hierarchy of categories comprising a plurality of nodes and one or more edges, wherein each of the plurality of nodes represents a category and each of the one or more edges connecting a pair of the plurality of nodes represents a relationship between a plurality of categories represented by the pair of nodes;
identify a node corresponding to a category of the hierarchy of categories associated with the item based at least in part on a set of the information describing the item;
for each additional item of the one or more items, identify an additional node corresponding to an additional category of the hierarchy of categories associated with the additional item based at least in part on a set of the information describing a corresponding item;
identify a set of nodes within a threshold distance of the node corresponding to the category of the hierarchy of categories associated with the item; and
identify the set of the one or more items having at least the threshold measure of similarity to the item, wherein the set of the one or more items correspond to the set of nodes.

18. The computer program product of claim 11, wherein the set of attributes of the content item comprises one or more selected from the group consisting of: a set of pixel values associated with the image comprising the content item, a tag comprising the content item, a link comprising the content item, a caption comprising the content item, a location associated with the content item, a comment on the content item, an audience associated with the content item, an inferred relationship between the content item and a topic, and any combination thereof.

19. The computer program product of claim 11, wherein the content item is received from the entity.

20. The computer program product of claim 11, wherein the content item is received from a content-providing user of the online system other than the entity.

* * * * *